United States Patent Office 3,510,696
Patented May 5, 1970

3,510,696
TRANSDUCER OUTPUT CORRECTION CIRCUITRY
David W. Bargen, Pasadena, Robert H. Russell, Altadena, and Richard J. Zollinger, Sierra Madre, Calif., assignors, by mesne assignments, to Whittaker Corporation, Los Angeles, Calif.
Filed Aug. 7, 1967, Ser. No. 658,887
Int. Cl. G01n 27/00
U.S. Cl. 307—308                                  6 Claims

ABSTRACT OF THE DISCLOSURE

Output correction circuitry for transducers having electrically excited sensor elements connected in an electrical measuring circuit. The transducer electrical output is fed through an amplifier, the amplifier output being sampled and fed back to alter the electrical excitation of the sensors to introduce a desired second order (quadratic) correction of the transducer electrical output.

BACKGROUND OF THE INVENTION

Strain-electrical translating elements are used as sensors in various types of transducers, the change in resistance of the sensor when subjected to stress being measured to determine the magnitude of the applied force which produces the stress. It is common practice to include corrective circuitry in the transducer to compensate for known characteristics of the sensors, such as a temperature expansion characteristic for example, but it is also frequently desirable to correct for a known characteristic of the means applying the stress which is to be measured, thereby correctively compensating the entire system to eliminate the necessity for applying correction to the obtained measurement. Although it is relatively easy to provide a first order (linear) correction, second order or quadratic (non-linear) corrections have heretofore required relatively complex circuitry and apparatus, such as servo systems for example. The present invention is directed toward a technique for providing transducer systems with second order corrections, using relatively simple circuitry and components.

SUMMARY OF THE INVENTION

The present invention is based upon the concept of using electrical feedback to alter the sensor electrical excitation in a compensating manner to provide quadratic correction of the transducer output. When using a Wheatstone bridge type circuit to measure changes in sensor resistance the bridge output is fed through an amplifier, the amplifier output sampled and a predetermined portion fed back to alter the bridge excitation in a corrective manner, thereby enabling linearization of a non-linear system as well as rendering a linear system non-linear.

Accordingly, it is an object of the present invention to provide transducer output correction circuitry.

It is also an object of the present invention to provide quadratic correction of the electrical output of transducers.

It is another object of the present invention to provide relatively simple and inexpensive output correction circuitry for transducers employing electrically excited sensor elements.

It is a further object of the present invention to provide output correction circuitry of the character described using feedback to introduce quadratic correction of the transducer electrical output.

The novel features which are believed to be characteristic of the invention, both as to its organization and method of operation, together with further objects and advanages thereof, will be better understood from the following description considered in connection with the accompanying drawings in which various embodiments of the invention are illustrated by way of example. It is to be expressly understood, however, that the description is for the purpose of illustration only and that the true spirit and scope of the invention is to be defined by the accompanying claims.

DESCRIPTION OF THE PREFERRED EMBODIMENT

The present invention technique utilizing feedback was developed for the purpose of providing electrical compensation in the form of a second order correction to linearize a non-linear electrical measuring system. However, the present invention technique may also be used to render a linear system non-linear. In either application, the present invention technique results in the performance of a complex electrical function with relatively simple circuitry.

To assist in a clear understanding of the mathematical background of the present invention technique, consider the density of a gas as a function of the pressure/temperature ratio ($P/T$). It is known that for an ideal gas this function is a linear one, and hence measurement of density could theoretically be conveniently and accurately accomplished by using a transducer which produces an electrical output signal proportional to a pressure/temperature ratio input. However, it has been found that for the real gases there is a deviation from the theoretical (linear) ideal gas curve at high $P/T$ ratios due to compressibility of the gas. Expressed mathematically, the density of a real gas is:

$$M = K \frac{P/T}{1 + a(P/T)} \qquad (1)$$

where, $M$ = real gas density
$K$ = a constant
$a$ = correction factor for gas compressibility When the preceding equation is subjected to a Taylor series expansion it is seen that for cases where $a$ is small (as it is in the preceding gas density equation) a good approximation is obtained by considering only the first and second order terms and disregarding the higher order terms. Therefore, in order to provide a truly accurate density measuring system it is apparent that a second order correction should be applied to the transducer's linear output. In accordance with the present invention technique such a second order correction term can be readily applied through the use of feedback.

Figure 1:
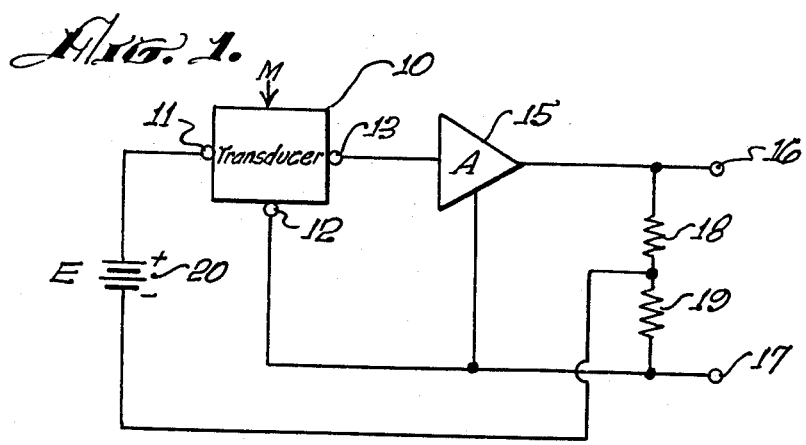
FIG. 1 is a schematic diagram of an electrical system incorporating feedback.

Turning now to FIG. 1 of the drawing, there is shown the schematic diagram of an electrical transducer circuit incorporating feedback. In this circuit a strain-electric transducer, generally indicated by the reference numeral 10, is provided with a pair of electrical input terminals 11 and 12 for connection to a source of DC excitation potential. The transducer 10 is also provided with an output terminal 13 at which appears an electrical output proportional to an applied input M. The transducer output terminal 13 is connected to the input of a linear amplifier 15, the amplifier output being connected to a pair of output terminals 16 and 17. A pair of resistors 18 and 19 are series connected across the output terminals 16 and 17 to form a voltage dividing network.

Excitation voltage for the transducer is provided by a battery 20, the battery providing a source voltage E, one terminal of the battery being connected to the excitation input terminal 11 and the other terminal of the battery being connected to the junction between the resistors 18 and 19. The other excitation input terminal 12 is connected to the amplifier output terminal 17. Accordingly, it is seen that feedback is provided to cause variation of the transducer excitation proportional to the output voltage of the amplifier.

For reference purposes the transducer excitation voltage (appearing between the terminals 11 and 12) will be indicated by the reference character $E_1$, and the transducer output voltage (appearing between the terminals 13 and 12) will be indicated by the reference character $E_2$. It is readily seen that the transducer output voltage $E_2 = KE_1M$, and is proportional to the transducer input M. The equation expressing the output voltage indicated by the reference character $E_0$ appearing between the terminals 16 and 17 is as follows:

$$E_0 = EKA \frac{M}{1 \pm aM} \quad (2)$$

where A represents the voltage gain of amplifier 15 and $a$ represents the fraction of the output voltage $E_0$ appearing across the resistor 19. That is, the voltage across resistor 19 equals $aE_0$.

It is seen that Equation 2 is identical in form to Equation 1, M in Equation 2 being equivalent to $P/T$ in Equation 1. Thus, it is apparent that the inverse feedback shown in the system of FIG. 1 provides a second order correction term for the linear transducer output, the magnitude of the correction factor being readily adjustable by altering the feedback factor. It is also apparent that the basic system shown in FIG. 1 could be used to accurately measure gas density over wide ranges of pressure, the input to transducer 10 being the pressure/temperature ratio of the gas, the transducer output at terminal 13 being directly proportional to $P/T$, and the corrected output obtained across the terminals 16 and 17 representing the actual gas density when the resistance value of resistors 18 and 19 are adjusted to provide the correct amount of feedback so that the fraction of the source voltage E appearing across resistor 19 will provide the desired second order correction term in accordance with the compressibility of the gas.

Figure 2:
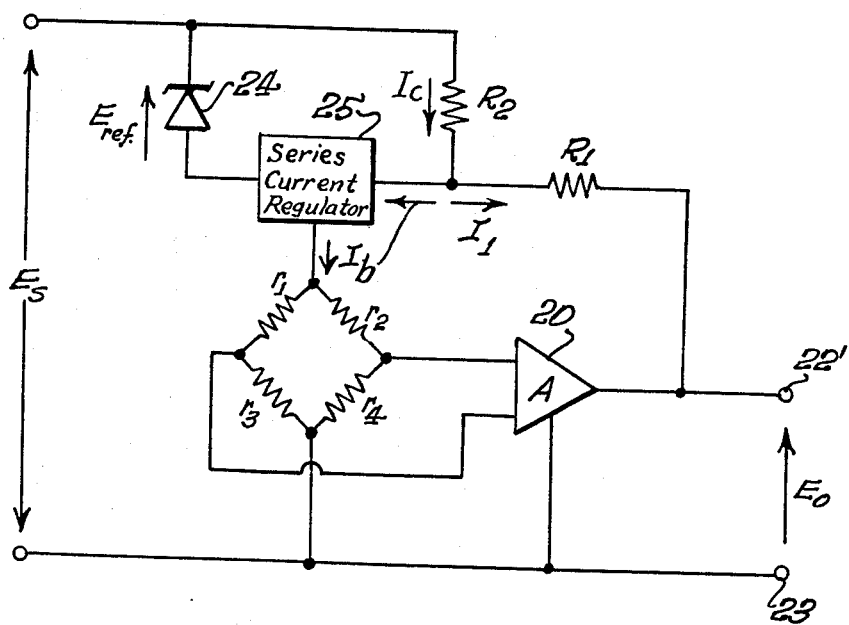
FIG. 2 is a schematic diagram illustrating the use of a strain-electric transducer in the basic feedback system of FIG. 1.

Turning now to FIG. 2 of the drawing there is shown the schematic diagram of a practical embodiment using the circuit of FIG. 1, wherein platinum probes were used as temperature sensing devices for temperature measurements over the range from −65° F. to 1,500° F. The transducer comprises four sensor elements, respectively indicated as $r_1$–$r_4$, the sensor elements being connected to form a Wheatstone bridge circuit having four active arms. The bridge output is fed to an amplifier 20, the amplifier 20 being of the differential input, single-ended output type. The output of amplifier 20 is fed to a pair of output terminals 22 and 23, across which an output voltage $E_0$ appears during circuit operation.

The circuit is powered from a constant voltage source, $E_s$, the transducer bridge being excited from the source voltage through a series current regulator 25 which, in conjunction with a Zener diode 24 and a current sensing resistor $R_2$, provides a constant current source for resistor $R_2$. The reference voltage of the Zener diode 24 is indicated as $E_{ref.}$, the constant current through resistor $R_2$ produced by the series regulator 25 being indicated as $I_c$, and the bridge excitation current being indicated as $I_b$. The series current regulator 25 compares the voltage drop across the current sensing resistor $R_2$ with the constant voltage established by the Zener diode 24 to generate a control signal for regulating a variable impedance element, such as a transistor or vacuum tube, to maintain the current $I_c$, constant to keep the voltage drop across $R_2$ equal to the constant voltage $E_{ref.}$ provided by the Zener diode 24. A feedback resistor $R_1$ is provided to feed back a portion of the amplifier output to the series regulator 25, the feedback current through $R_1$ being indicated as $I_1$.

First consider the case where $R_1$ is omitted ($R_1 = \infty$) and there is no feedback. In this case the circuit operates in a normal fashion. If the bridge output varies linearly with the stimulation applied to the sensors, the circuit output will be linear. In general, the output voltage would be given by $E_0 = AI_c \Delta r$, where A represents the voltage gain of the amplifier 20, and $\Delta r$ represents the proportional change in bridge resistance resulting from a change in the sensor stimulus. In this case $I_c = I_b = a$ constant.

On the other hand, utilizing $R_1$ as shown in FIG. 2 ($R_1 \neq \infty$) the output voltage $E_0$ will be a nonlinear function of the change $\Delta r$. This can be seen as follows:

$$I_1 = \frac{E_s - E_{ref.} - E_0}{R_2}$$

Since $I_c = a$ constant, the bridge current is $$I_b = I_c - \frac{E_s - E_{ref.}}{R_1} + \frac{E_0}{R_1}$$

Thus, the bridge excitation current increases with increasing output voltage $E_0$. The output of the transducer system then, is:

$$E_0 = A \left( I_c - \frac{E_s - E_{ref.}}{R_1} + \frac{E_0}{R_1} \right) \Delta r$$

$$E_0 \left( 1 - A \frac{\Delta r}{R_1} \right) = A \left( I_c - \frac{E_s - E_{ref.}}{R_1} \right) \Delta r$$

$$\therefore E_0 = \frac{A \left( I_c - \frac{E_s - E_{ref.}}{R_1} \right) \Delta r}{1 - A \frac{\Delta r}{R_1}}$$

or $$E_0 \simeq A \left( I_c - \frac{E_s - E_{ref.}}{R_1} \right) \Delta r \left( 1 + A \frac{\Delta r}{R_1} \right)$$

so $$E_0 \simeq A \left( I_c - \frac{E_s - E_{ref.}}{R_1} \right) \left[ \Delta r + A \frac{(\Delta r)^2}{R_1} \right]$$

It was desired to utilize platinum probes as temperature sensing devices for temperature measurements over the range of from −65° F. to +1,500° F., because of the accuracy, stability and high output of platinum probes. However, over this extreme temperature range the non-linearity of the platinum probes was on the order of four percent. Use of the corrective circuitry of FIG. 2 resulted in a reduction in system non-linearity to a value of less than 0.20 percent throughout the temperature range from −65 to +1,500° F.

The amount of second order correction is determined by the resistance value of the resistor $R_1$. The non-linearity of platinum probes is well documented by the Bureau of Standards and so a first approximation of the amount of quadratic correction to be applied was made by reference to the published curves, and the resistance value of the resistor $R_1$ accordingly selected to give the indicated correction. It was found that this first approximation resulted in a reduction of system non-linearity to a value of about 1 percent, as measured by actual test and plotting percentage deviation from non-linearity as a function of temperature, setting zero deviation at the two temperature extremes. Then, by observing the percentage deviation from non-linearity near the midpoint of the temperature range a second approximation for the corrective factor was made and the resistance value of $R_1$ accordingly adjusted. Upon then testing system linearity it was found that adjustment of the resistance value of $R_1$ to provide the second approximation of the corrective factor resulted in a further decrease in system non-linearity from about 1 percent to less than 0.20 percent. Thus, it is seen that the amount of correction can be quickly determined by making a first approximation and then making a three point test, the points being at both ends of the temperature range and at the approximate midpoint, to then determine a second and more refined approximation.

From the preceding mathematical approach and illustrated practical example, those skilled in the art will readily appreciate that the present invention concepts are usable with any type of sensor elements or any electrical element having its output proportional to its input and some other stimulus. In addition to linearizing non-linear systems, as shown in the hereinabove illustrated example, the present invention technique is also equally applicable for rendering linear systems non-linear, thereby enabling the use of linear sensors to measure non-linear phenomenon. For example, through the use of the present invention feedback technique, a linear pressure transducer can be used as an altimeter. Accordingly, although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed. For example, although the illustrated embodiment pertained to connection of the sensors in a four active arm Wheatstone bridge circuit, any type of sensor excitation circuit may be utilized. Furthermore, it is not generally necessary to excite the sensor from a constant current source, nor to power the amplifier from a constant voltage source, such being used in the illustrated embodiment as a matter of preference for that specific system application.

What is claimed is:

1. A transducer output correction circuit for transducers of the type having a sensor element excited from a source of electrical operating potential for providing an electrical output that is a variable proportion of the electrical operating potential in response to variations in the conditions being sensed, comprising:
    (a) an amplifier having its input coupled to the electrical output of the sensor element and its output coupled to output terminals; and
    (b) means for feeding back a predetermined portion of the output of said amplifier to said source of electrical operating potential to vary the sensor electrical operating potential in a predetermined non-linear fashion so that the amplifier output varies in response to changes in the variable proportion of the electrical operating potential provided by said sensor element to permit a second order correction to electrical output provided by the sensor element.

2. A transducer output correction circuit for a transducer of the type wherein an excitation potential is applied from a source of DC operating potential to a sensor element having an impedance variable in response to a sensed condition, comprising:
    (a) a linear amplifier having its input coupled to the transducer output, and its output connected to output terminals;
    (b) voltage divider means connected across the output terminals of said linear amplifier to provide a portion of the voltage at its output as a feedback voltage; and
    (c) means connecting the source of DC operating potential in series with said voltage divider means to the transducer bridge circuit to superimpose said feedback voltage on the DC operating potential of said source to be applied as said excitation potential to said sensor element.

3. A transducer output correction circuit for transducers of the type wherein a sensor element is connected in at least one active arm of a bridge circuit provided with an input excitation signal from a constant level DC source, comprising:
    (a) a linear amplifier having its input coupled to receive an output signal from the bridge circuit and its output coupled to an output terminal; and
    (b) means coupled to said output terminal for feeding back a portion of the output of said amplifier to combine with said constant level DC source to alter the input excitation signal to said bridge circuit.

4. A transducer output correction circuit for transducers of the type wherein a sensor element is connected in at least one active arm of a bridge circuit provided with an excitation current from a constant current source, comprising:
    (a) an amplifier having its input coupled to the output of the bridge circuit and its output coupled to an output terminal; and
    (b) current feedback means coupling the output of said amplifier to said constant current source for altering the bridge excitation current in accordance with the output of said amplifier.

5. The circuit defined in claim 4, wherein said constant current source comprises a series current regulator coupled in series with said bridge circuit to maintain a constant current flow to a junction to be divided between said bridge circuit and said feedback means, and said current feedback means constitutes a fixed resistance means.

6. The circuit defined in claim 5, wherein the resistance value of said resistance means relative to the value of said bridge circuit is a function of the deviation of the output of said amplifier absent said resistance means.

References Cited

UNITED STATES PATENTS

| | | | |
|---|---|---|---|
| 2,730,618 | 1/1956 | Michaels | 323—75 |
| 3,248,654 | 4/1966 | Shiragaki | 307—308 |

DONALD D. FARRER, Primary Examiner

D. M. CARTER, Assistant Examiner

U.S. Cl. X.R.

73—30; 307—297, 318; 235—151.35; 328—1

UNITED STATES PATENT OFFICE
CERTIFICATE OF CORRECTION

Patent No. 3,510,696

May 5, 1970

David W. Bargen et al.

It is certified that error appears in the above identified patent and that said Letters Patent are hereby corrected as shown below:

Column 4, line 12, "$E_0 = A\iota_c \Delta r$" should read -- $E_0 = AI_c \Delta r$ --; line 17, "$(R_1 \doteq \infty)$" should read -- $(R_1 \neq \infty)$ --; line 21, "$R_2$" should read -- $R_1$ --. Column 5, line 56, after "to", second occurrence, insert -- the --.

Signed and sealed this 22nd day of December 1970.

(SEAL)
Attest:

Edward M. Fletcher, Jr.
Attesting Officer

WILLIAM E. SCHUYLER, JR.
Commissioner of Patents